US011951397B2

(12) United States Patent
Kouno et al.

(10) Patent No.: US 11,951,397 B2
(45) Date of Patent: Apr. 9, 2024

(54) DISPLAY CONTROL PROGRAM, DISPLAY CONTROL DEVICE, AND DISPLAY CONTROL METHOD

(71) Applicant: Sony Interactive Entertainment Inc., Tokyo (JP)

(72) Inventors: Tsutomu Kouno, Tokyo (JP); Hiroya Matsugami, Saitama (JP)

(73) Assignee: Sony Interactive Entertainment Inc., Tokyo (JP)

( * ) Notice: Subject to any disclaimer, the term of this patent is extended or adjusted under 35 U.S.C. 154(b) by 408 days.

(21) Appl. No.: 17/292,770

(22) PCT Filed: Nov. 12, 2019

(86) PCT No.: PCT/JP2019/044294
§ 371 (c)(1),
(2) Date: May 11, 2021

(87) PCT Pub. No.: WO2020/105503
PCT Pub. Date: May 28, 2020

(65) Prior Publication Data
US 2021/0394069 A1    Dec. 23, 2021

(30) Foreign Application Priority Data
Nov. 19, 2018 (JP) .................. 2018-216863

(51) Int. Cl.
*A63F 13/577* (2014.01)
*A63F 13/428* (2014.01)
(Continued)

(52) U.S. Cl.
CPC .......... *A63F 13/577* (2014.09); *A63F 13/428* (2014.09); *A63F 13/5255* (2014.09);
(Continued)

(58) Field of Classification Search
None
See application file for complete search history.

(56) References Cited

U.S. PATENT DOCUMENTS 6,623,358 B2    9/2003 Harima
7,785,198 B2 *  8/2010 Kando .................. A63F 13/822
                                                         463/31
(Continued)

FOREIGN PATENT DOCUMENTS

JP    2001276418 A    10/2001
JP    2004062676 A     2/2004
(Continued)

OTHER PUBLICATIONS

International Preliminary Report on Patentability and Written Opinion for corresponding PCT Application No. PCT/JP2019/044294, 11 pages, dated Jun. 3, 2021.

(Continued)

*Primary Examiner* — Ronald Laneau
(74) *Attorney, Agent, or Firm* — Matthew B. Dernier, Esq.

(57) ABSTRACT

A game device that is an exemplary display control device includes an image generation section configured to generate an image of a virtual three-dimensional space, an object control section configured to control an object disposed in the virtual three-dimensional space, the object including a plurality of particles, a player character control section configured to control a player character disposed in the virtual three-dimensional space, the player character being operable by a player, a determination section configured to determine whether or not the player character has touched the object, and an absorption control section configured to execute, in a case where the determination section determines that the player character has touched the object, an (Continued)

action representing that the plurality of particles included in the object that the player character has touched are absorbed by the player character.

19 Claims, 16 Drawing Sheets

(51) Int. Cl.
- *A63F 13/5255* (2014.01)
- *A63F 13/54* (2014.01)
- *A63F 13/65* (2014.01)
- *G02B 27/00* (2006.01)
- *G02B 27/01* (2006.01)

(52) U.S. Cl.
CPC .............. *A63F 13/54* (2014.09); *A63F 13/65* (2014.09); *G02B 27/0093* (2013.01); *G02B 27/017* (2013.01); *G02B 27/0179* (2013.01); *A63F 2300/8082* (2013.01); *G02B 2027/0187* (2013.01)

(56) References Cited

U.S. PATENT DOCUMENTS

| | | |
|---|---|---|
| 8,509,485 B2 | 8/2013 | Shinoyama |
| 2001/0027129 A1 | 10/2001 | Harima |
| 2004/0021667 A1 | 2/2004 | Tsuda |
| 2012/0027254 A1 | 2/2012 | Shinoyama |
| 2015/0352437 A1* | 12/2015 | Koseki ................ A63F 13/5255 463/31 |
| 2016/0026253 A1* | 1/2016 | Bradski ................ H04N 13/128 345/8 |
| 2019/0094981 A1* | 3/2019 | Bradski ................ H04N 21/414 |

FOREIGN PATENT DOCUMENTS

| | | |
|---|---|---|
| JP | 2012032951 A | 2/2012 |
| WO | 2017029915 A1 | 2/2017 |

OTHER PUBLICATIONS

International Search Report for corresponding PCT Application No. PCT/JP2019/044294, 4 pages, dated Jan. 21, 2020.

* cited by examiner

FIG.4
(a)
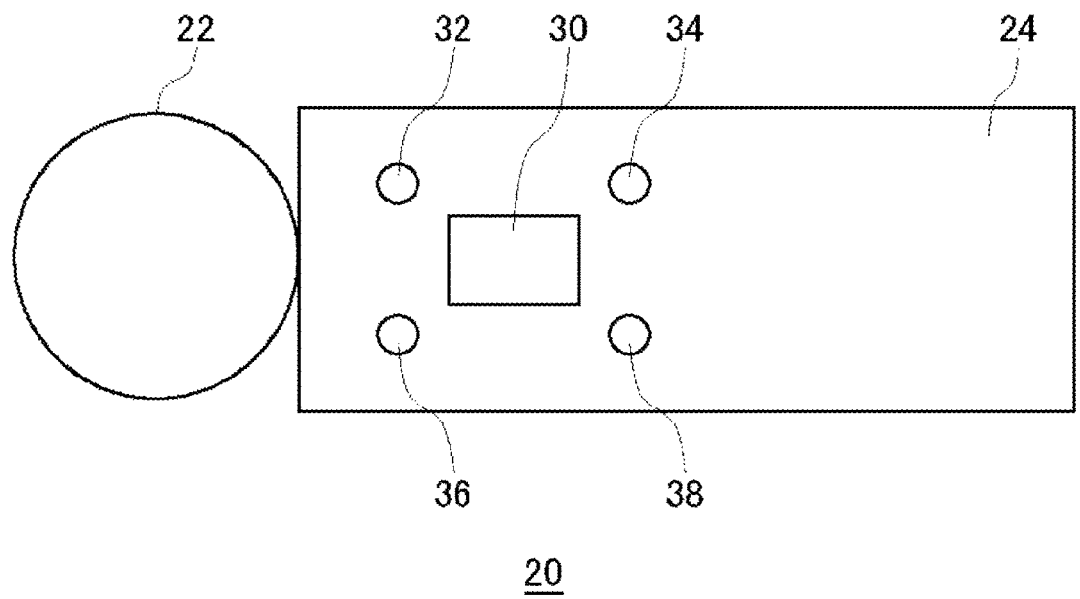
(b)
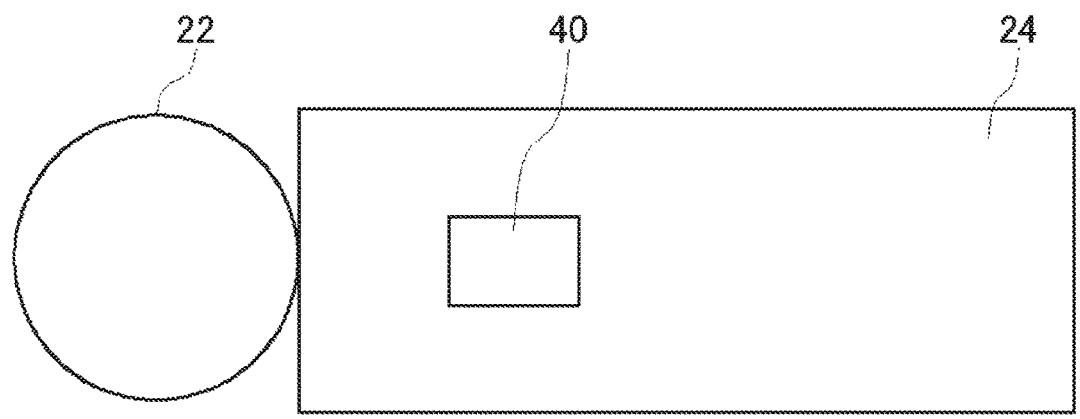

FIG.9
(a)
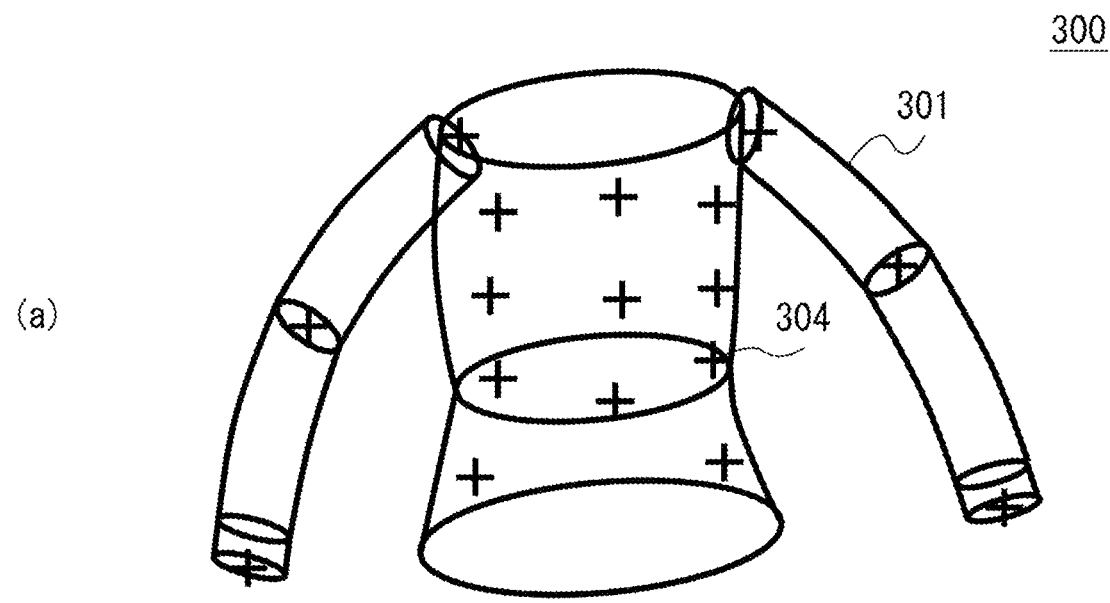
(b)
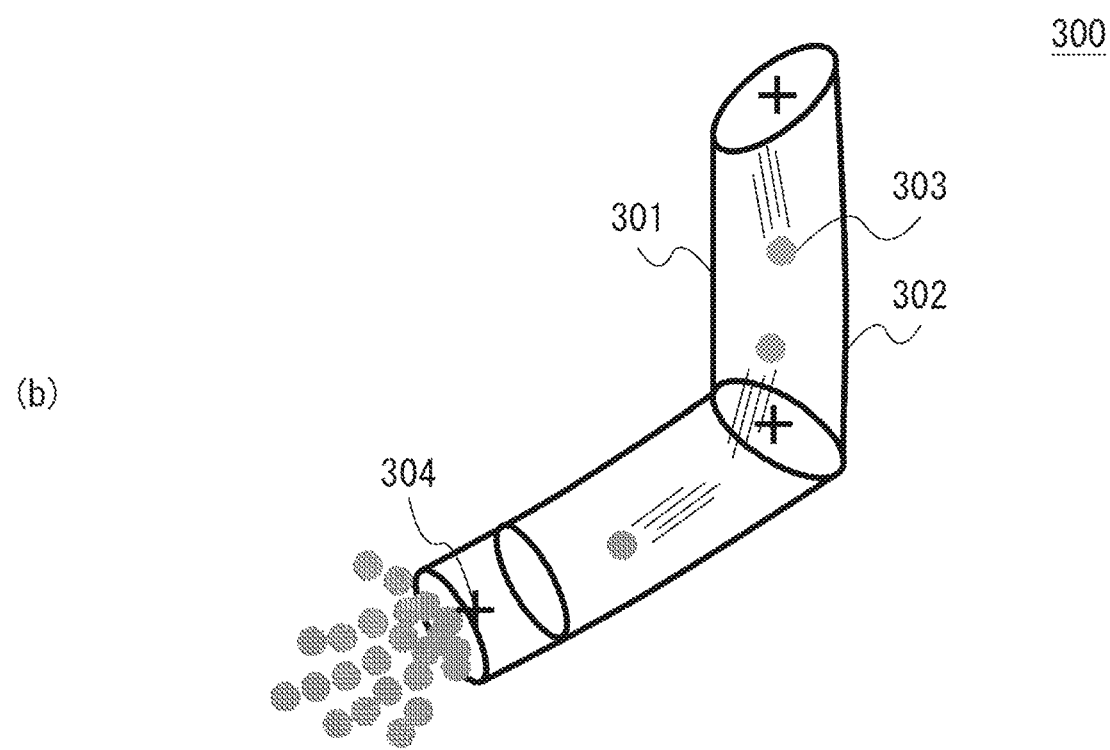

FIG.10
(a) 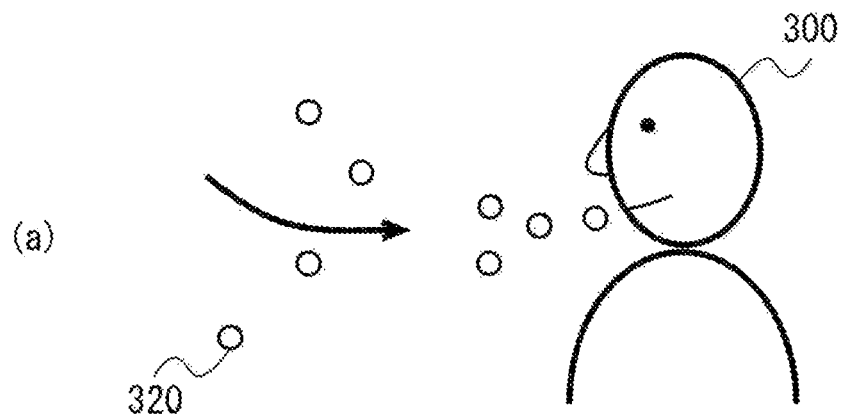
(b) 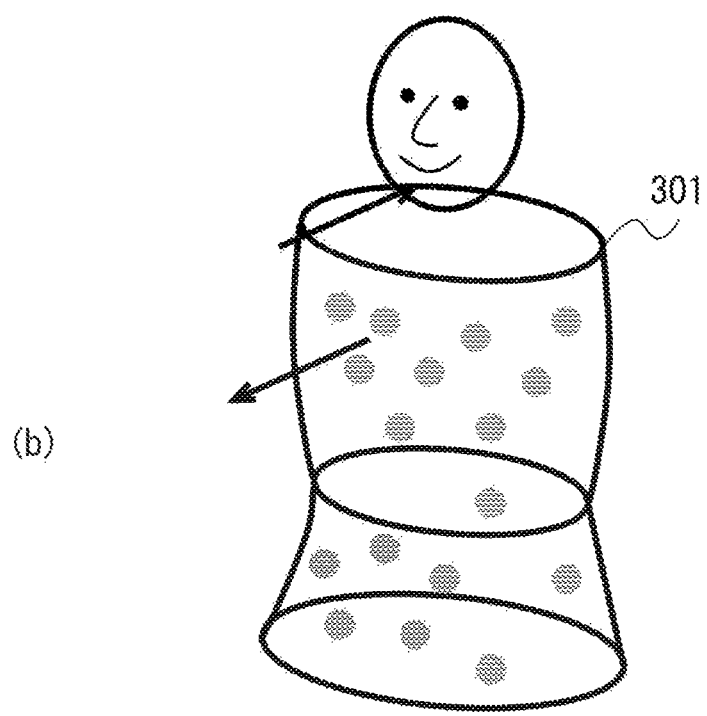
(c) 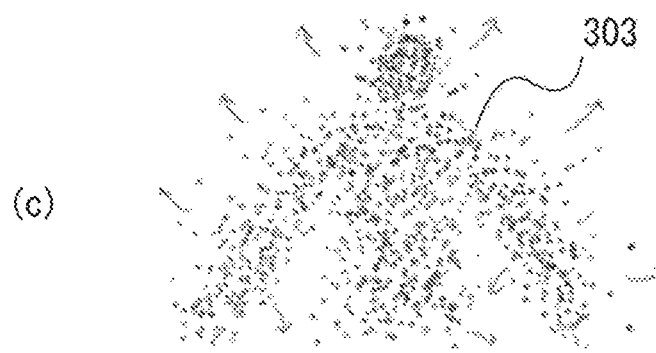

FIG.11
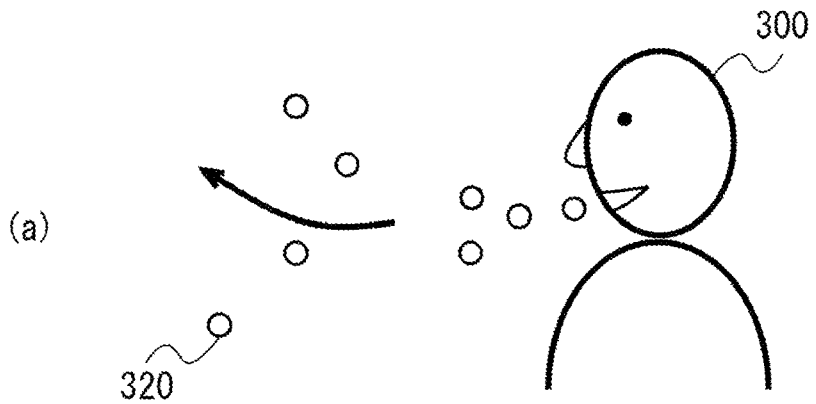
(a)
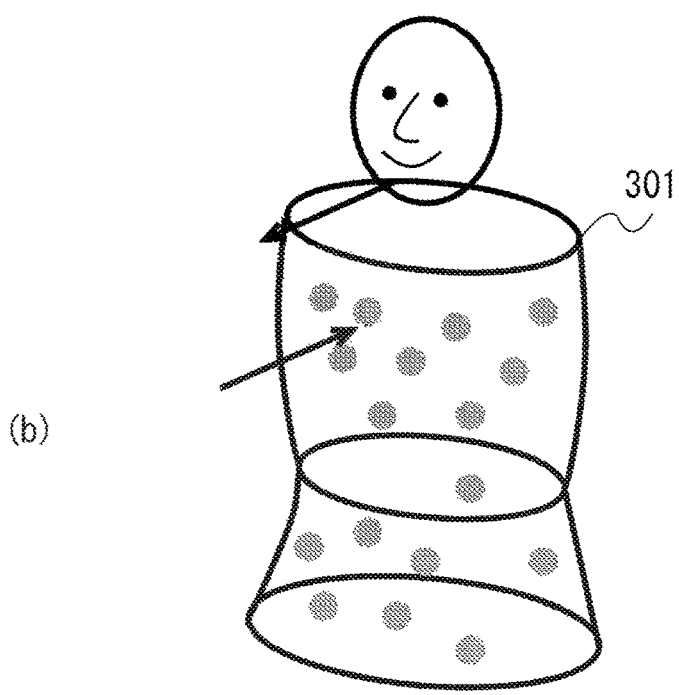
(b)
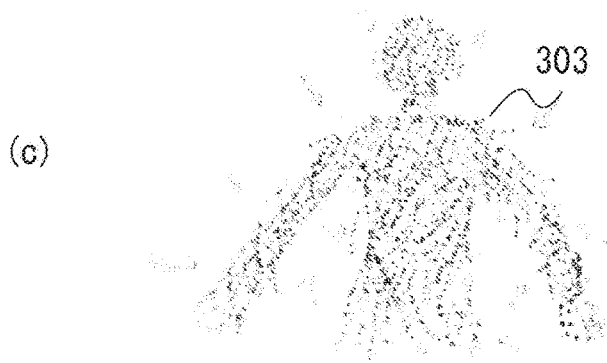
(c)

FIG.12
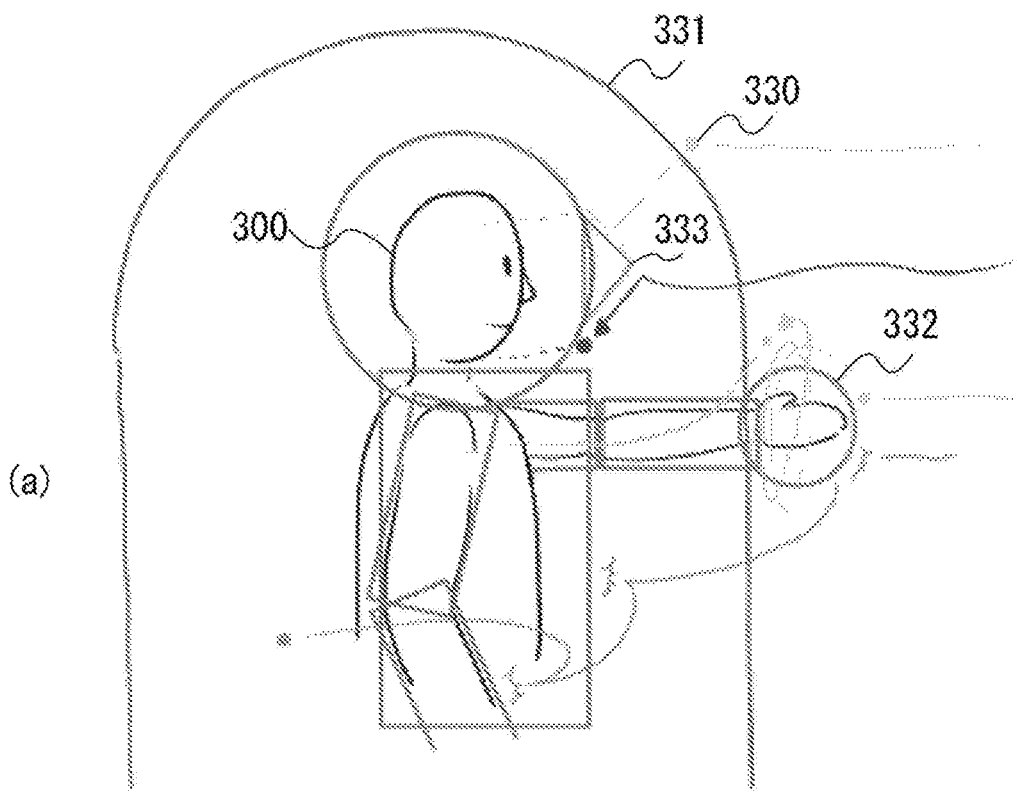
(a)
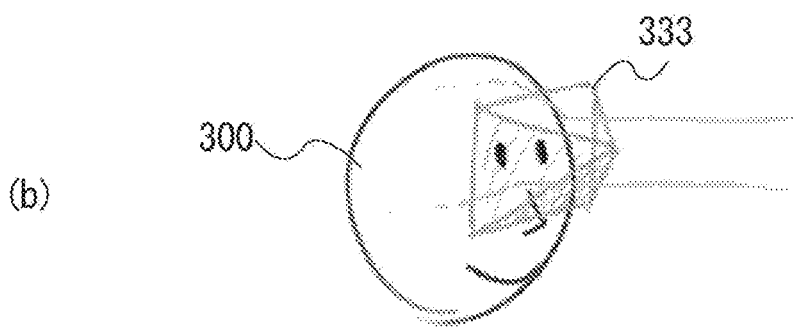
(b)

FIG.13
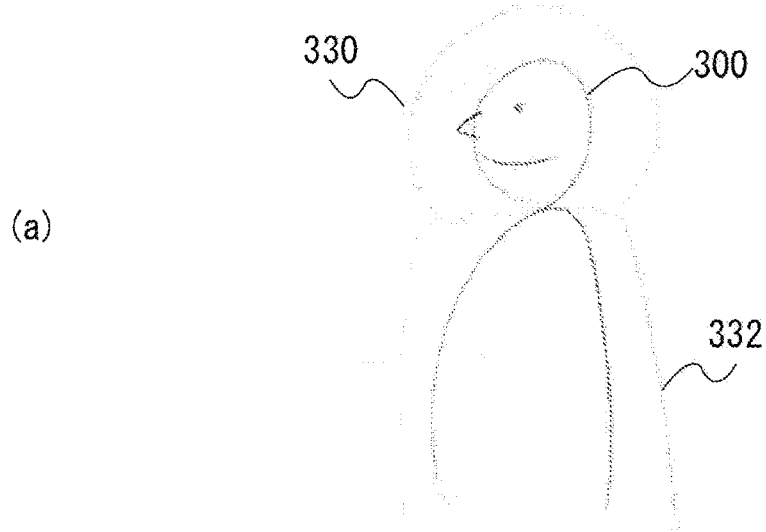
(a)
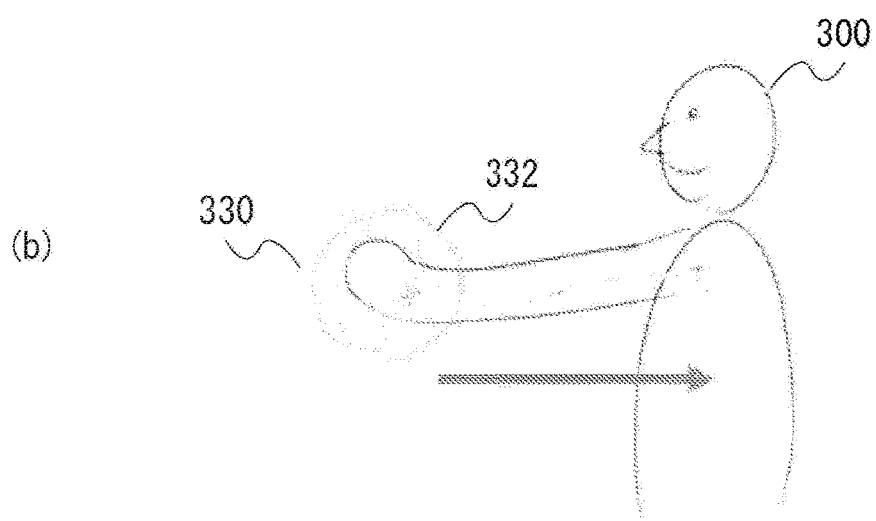
(b)
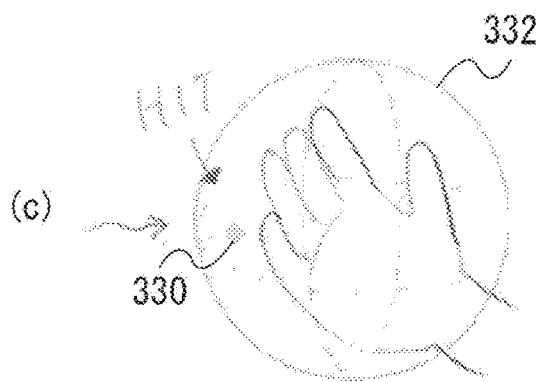
(c)
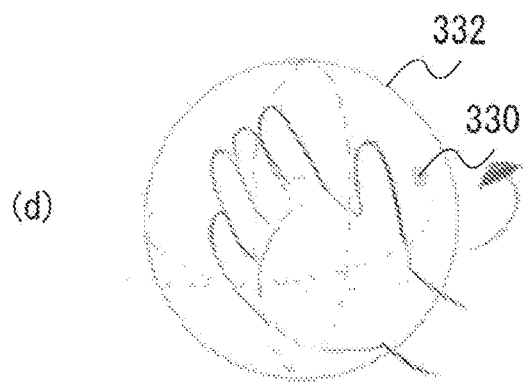
(d)

FIG.15
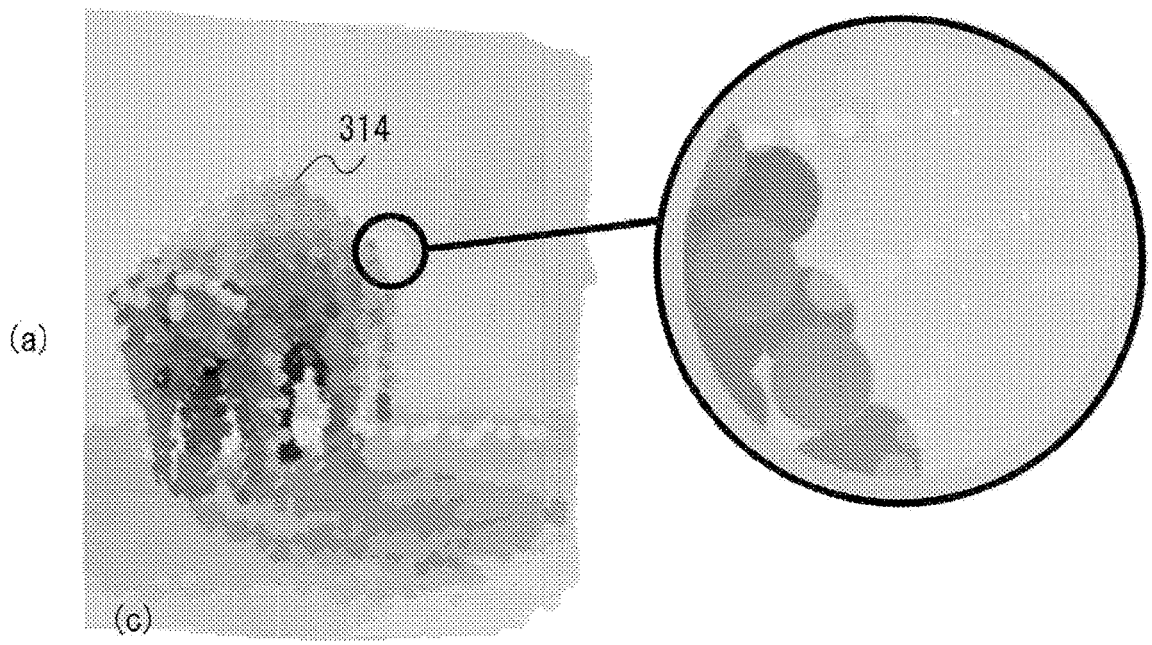
(a)
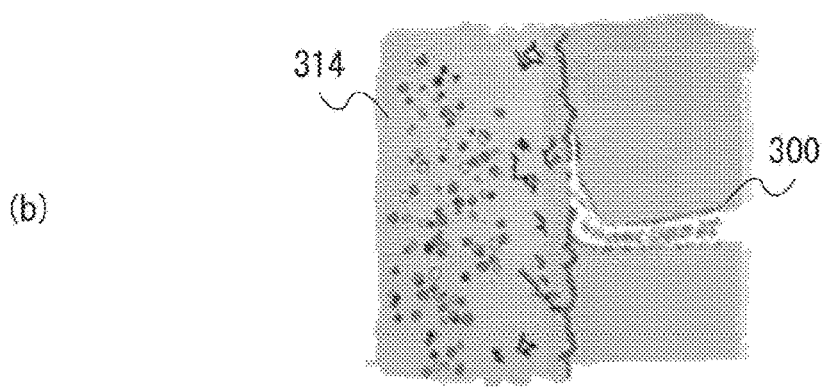
(b)
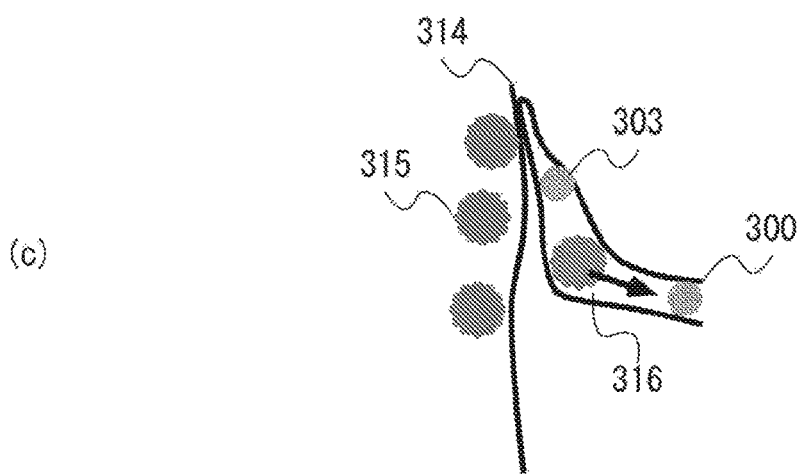
(c)

DISPLAY CONTROL PROGRAM, DISPLAY CONTROL DEVICE, AND DISPLAY CONTROL METHOD

TECHNICAL FIELD

The present invention relates to a display control technology, in particular, to a display control program, a display control device, and a display control method that control display on display devices.

BACKGROUND ART

Games that a user wearing, on his/her head, a head-mounted display connected to a game console can play by operating a controller or the like while watching a screen displayed on the head-mounted display have been popular. Using the head-mounted display increases the immersion in the video worlds and thus makes the games more entertaining.

SUMMARY

Technical Problem

The inventors of the present invention have considered that the mental states of viewers can be enhanced by utilizing such highly immersive video worlds, and have conceived of the present invention. That is, it is an object of the present invention to provide a display technology capable of giving comfortable feeling to viewers.

Solution to Problem

In order to solve the above-mentioned problem, according to an aspect of the present invention, there is provided a display control program for causing a computer to achieve an image generation section configured to generate an image of a virtual three-dimensional space, an object control section configured to control an object disposed in the virtual three-dimensional space, the object including a plurality of particles, a player character control section configured to control a player character disposed in the virtual three-dimensional space, the player character being operatable by a player, a determination section configured to determine whether or not the player character has touched the object, and an absorption control section configured to execute, in a case where the determination section determines that the player character has touched the object, an action representing that the plurality of particles included in the object that the player character has touched are absorbed by the player character.

According to another aspect of the present invention, there is provided a display control device. The device includes an image generation section configured to generate an image of a virtual three-dimensional space, an object control section configured to control an object disposed in the virtual three-dimensional space, the object including a plurality of particles, a player character control section configured to control a player character disposed in the virtual three-dimensional space, the player character being operatable by a player, a determination section configured to determine whether or not the player character has touched the object, and an absorption control section configured to execute, in a case where the determination section determines that the player character has touched the object, an action representing that the plurality of particles included in the object that the player character has touched are absorbed by the player character.

According to still another aspect of the present invention, there is provided a display control method. The method causes a computer to execute the steps of generating an image of a virtual three-dimensional space, controlling an object disposed in the virtual three-dimensional space, the object including a plurality of particles, controlling a player character disposed in the virtual three-dimensional space, the player character being operatable by a player, determining whether or not the player character has touched the object, and executing, in a case where it is determined that the player character has touched the object, an action representing that the plurality of particles included in the object that the player character has touched are absorbed by the player character.

Note that, optional combinations of the above-mentioned components, and conversions of expressions of the present invention between systems, computer programs, recording media having computer programs recorded thereon in a readable manner, data structures, and the like may also be practiced as a mode of the present invention.

Advantageous Effects of Invention

According to the present invention, it is possible to provide the display technology capable of giving comfortable feeling to viewers.

BRIEF DESCRIPTION OF DRAWINGS

FIG. 4 depicts diagrams illustrating the external configuration of an input device.

FIG. 9 depicts diagrams illustrating an exemplary player character disposed in the game world.

FIG. 10 depicts diagrams illustrating exemplary video representation of the player character when a player breathes.

FIG. 11 depicts diagrams illustrating exemplary video representation of the player character when the player breathes.

FIG. 12 depicts diagrams illustrating an interaction between the player character and an object or particles.

FIG. 13 depicts diagrams illustrating an exemplary absorption action when the particles are absorbed by the player character.

FIG. 15 depicts diagrams illustrating an exemplary absorption action when the particles of an object are absorbed by the player character.

DESCRIPTION OF EMBODIMENT

A game device according to an embodiment is an exemplary display control device, and generates and displays the image of a game world in which objects and a character are disposed in a virtual three-dimensional space. The objects such as animals and plants and the player character representing the player's body include a plurality of photons in the game world so that the video representation of the game world representing a fantastic imagined world is provided to the player. The video representation corresponds to the fact that all matter is made of elementary particles, and makes the player think as if the particles serve as energy sources in the game world. When the player operates the player character to touch an object disposed in the game world, the game device displays an image in which the particles of the object are sucked into the player character while shining. The player can touch and resonate with the animals or the plants to get energy in the game world, that is, can get a novel comfortable and relaxing experience. With this, the mental state of the player can be enhanced through the game.

Such video representation may be displayed on a stationary display device, a portable display device, or the like, but works more effectively when being displayed using a head-mounted display (HMD). In this case, the game device sets the viewpoint position to a position corresponding to the player character's eyes, renders the virtual three-dimensional space having the objects disposed therein while changing the line of sight depending on the orientation of the head-mounted display, and displays the generated first-person view image on the head-mounted display. This allows the player to get a deep immersive experience, that is, to feel as if he/she is actually in the fantastic imagined world. Further, the player can get the novel comfortable and relaxing experience in the more realistic video representation, and hence the mental state can be enhanced more effectively.

Figure 1:
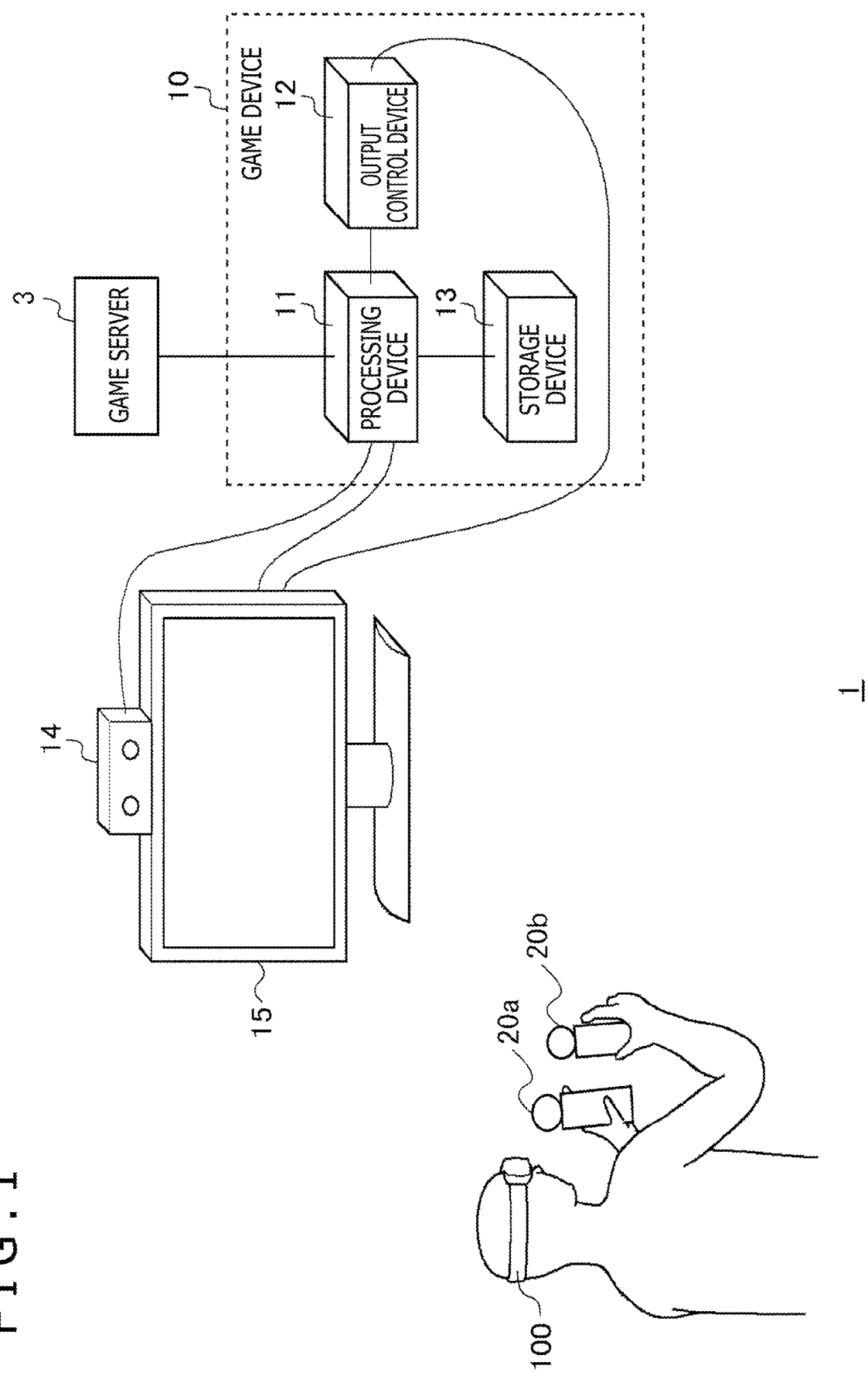
FIG. 1 is a diagram illustrating a configuration example of a game system according to an embodiment.

FIG. 1 illustrates a configuration example of a game system 1 according to the embodiment. The game system 1 includes a game device 10, a head-mounted display 100, input devices 20a and 20b (correctively referred to as "input device 20") that the player holds and operates, an imaging device 14 configured to capture the player wearing the head-mounted display 100, and an output device 15 configured to display images. The output device 15 may be a television. The game device 10 is connected to an external network such as the Internet via an access point (AP) or the like.

The game device 10 of the present embodiment is connected to a game server 3 provided to allow a plurality of players to play a game with the game devices 10 at the same time to share the game world. The game server 3 acquires, from the game devices 10 participating in the game, information such as the positions of the player characters, and distributes the acquired information to the game devices 10.

The head-mounted display 100 is worn on the player's head and provides the virtual reality (VR) video world to the player. The head-mounted display 100 has a head tracking function so that the head-mounted display 100 updates displayed images in conjunction with the movement of the player's head, thereby enhancing immersion in the video world.

The game device 10 includes a processing device 11, an output control device 12, and a storage device 13. The processing device 11 receives operation information input by the player to the input device 20, position information and posture information regarding the input device 20 and the head-mounted display 100, and the like, to thereby execute the game application. The processing device 11 may be connected to the input device 20 through a cable or a known wireless communication protocol. The output control device 12 is a processing unit configured to output image data generated by the processing device 11 to the head-mounted display 100. The output control device 12 may be connected to the head-mounted display 100 through a cable or a known wireless communication protocol. The storage device 13 stores program data on the game application, shape data on the virtual three-dimensional space to be used by the game application, shape data on objects or characters to be disposed, and the like.

The imaging device 14 is a stereo camera configured to capture the player wearing the head-mounted display 100 at a given interval and supplies the captured images to the processing device 11. As described later, the head-mounted display 100 is provided with a marker (light-emitting diode (LED) for tracking) for tracking the player's head, and the processing device 11 detects the movement of the head-mounted display 100 on the basis of the positions of the maker included in captured images. The head-mounted display 100 has mounted thereon a posture sensor (accelerometer and gyroscope), and the processing device 11 acquires sensor data detected by the posture sensor from the head-mounted display 100, to thereby perform precision tracking processing by utilizing the sensor data and the captured images of the marker. Note that, various tracking methods have hitherto been proposed, and the processing device 11 may employ any tracking method that can detect the movement of the head-mounted display 100.

Further, as described later, the input device 20 is provided with a marker (light-emitting section) for detecting the posture (for example, position and orientation) of the input device 20 in the real space. The processing device 11 detects the position and orientation of the input device 20 on the basis of the position and form of the maker included in a captured image. As a modified example, the input device 20 may have mouthed thereon a posture sensor (for example, accelerometer and gyroscope). The processing device 11 may acquire, from the input device 20, sensor data detected by the posture sensor, and may detect the position and orientation of the input device 20 by utilizing the sensor data instead of or together with the captured image of the marker. Note that, other well-known methods that can detect the position and orientation of the input device 20 may be employed.

Since the player watches images using the head-mounted display 100, the output device 15 is not necessarily required, however, the output device 15 allows another viewer to watch the images. The output control device 12 or the processing device 11 may control the output device 15 to display the same image as that the player wearing the head-mounted display 100 watching or another image. For example, in a case where the player wearing the head-mounted display 100 and another viewer play the same game together, the output device 15 may display game images as viewed from the viewpoint of the character corresponding to the other viewer.

The head-mounted display 100 is a display device that is worn on the player's head to display images on display panels positioned in front of the player's eyes. The head-mounted display 100 displays images for the left eye on the left-eye display panel and displays images for the right eye on the right-eye display panel. The displayed images are parallax images as viewed from the left and right viewpoints and achieve stereoscopic views. Note that, since the player watches the display panels through optical lenses, the game device 10 supplies, to the head-mounted display 100, parallax image data subjected to the correction of optical distortion due to the lenses. The optical distortion correction processing may be performed by either the processing device 11 or the output control device 12.

Note that, the function of the output control device 12 may be incorporated into the processing device 11. That is, the processing unit of the game device 10 may include only the processing device 11 or include the processing device 11 and the output control device 12. In the following, the functions for providing VR images to the head-mounted display 100 are collectively described as the function of the game device 10.

Figure 2:
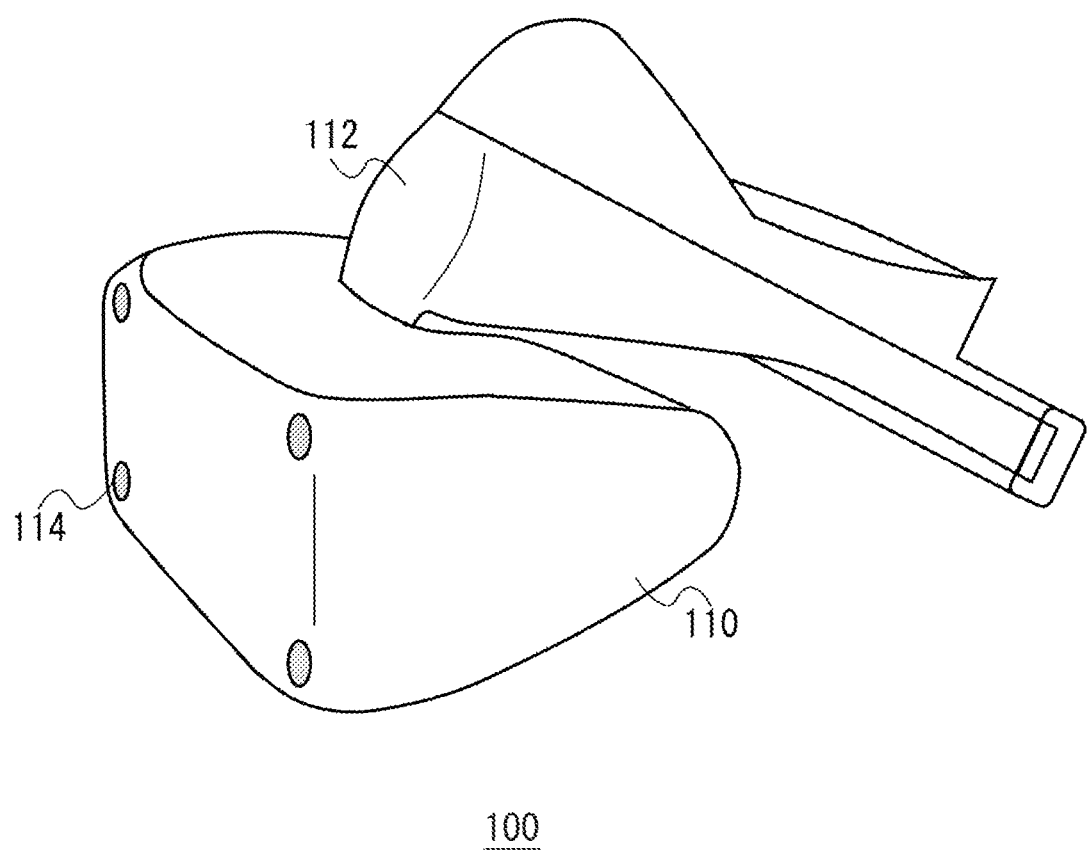
FIG. 2 is an external view of a head-mounted display according to the embodiment.

FIG. 2 is an external view of the head-mounted display 100 according to the embodiment. The head-mounted display 100 includes a main body section 110, a head contact section 112, and a light-emitting section 114.

The main body section 110 includes a display, a global positioning system (GPS) unit for acquiring position information, a posture sensor, a communication device, and the like. The head contact section 112 may include biological information acquisition sensors capable of measuring biological information such as the player's body temperature, pulse rate, blood components, perspiration, brain waves, and cerebral blood flow. The light-emitting section 114 emits light in a color specified by the game device 10 and functions as a reference for calculating the position of the head-mounted display 100 in an image captured by the imaging device 14.

The head-mounted display 100 may further be provided with a camera for capturing the player's eyes. With the camera mounted on the head-mounted display 100, the player's line of sight, pupil movement, blinks, and the like can be detected.

Although the head-mounted display 100 is described in the present embodiment, the display control technology of the present embodiment is applicable not only to a case where the head-mounted display 100 in a narrow sense is worn, but also to a case where eyeglasses, an eyeglass-type display, an eyeglass-type camera, a headphone, a headset (microphone-equipped headphone), an earphone, an earring, an ear-mounted camera, a hat, a camera-equipped hat, or a hair band is worn.

Figure 3:
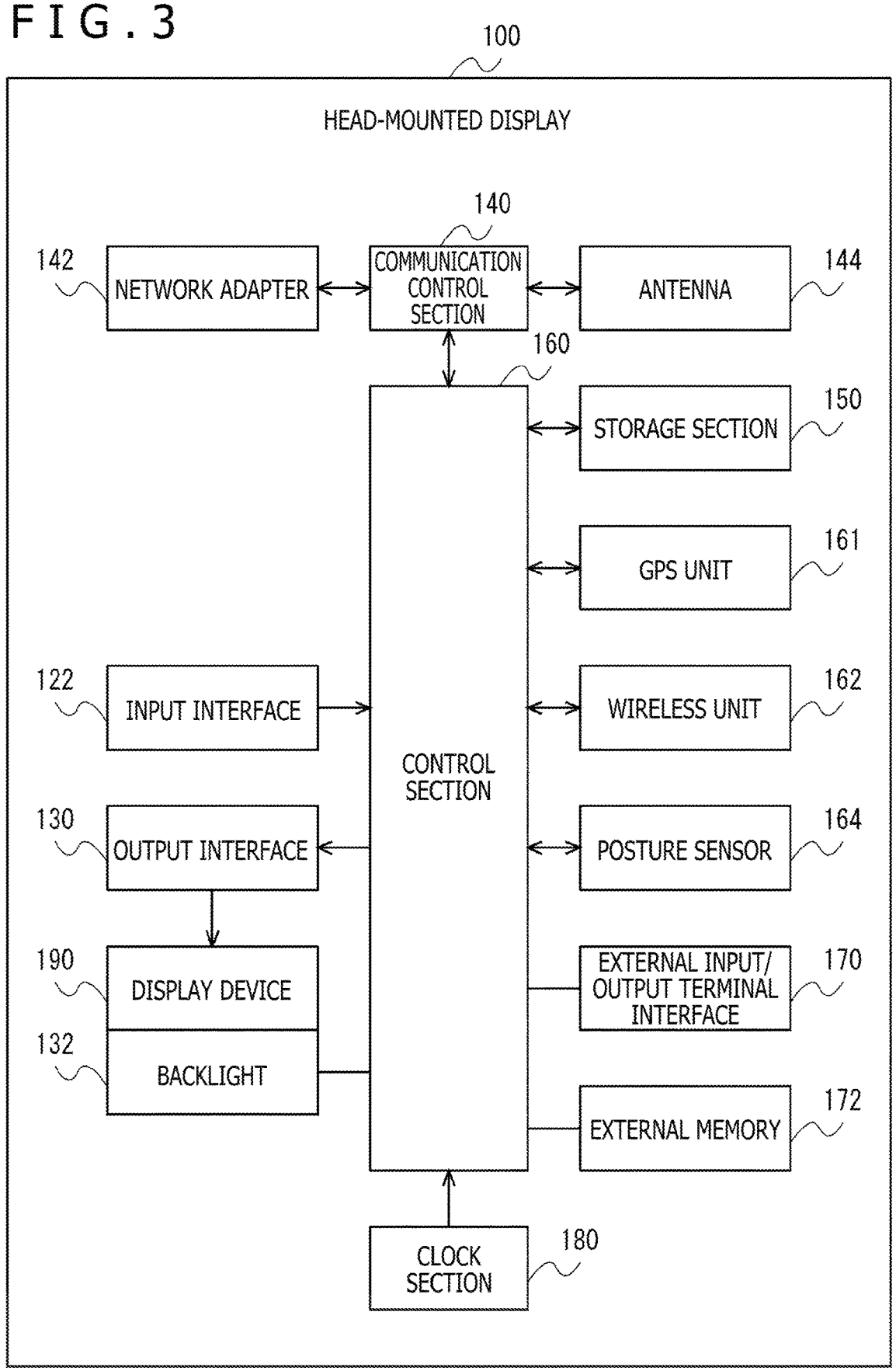
FIG. 3 is a functional configuration diagram of the head-mounted display.

FIG. 3 is a functional configuration diagram of the head-mounted display 100. The head-mounted display 100 includes an input interface 122, an output interface 130, a backlight 132, a communication control section 140, a network adapter 142, an antenna 144, a storage section 150, a GPS unit 161, a wireless unit 162, a posture sensor 164, an external input/output terminal interface 170, an external memory 172, a clock section 180, a display device 190, and a control section 160.

In terms of hardware components, these configurations may be achieved by the central processing unit (CPU) or memory of any computer, programs loaded on the memory, or the like. Here, the functional blocks that are achieved by these components in cooperation with each other are illustrated. Thus, it should be understood by persons skilled in the art that these functional blocks can be achieved in a variety of forms by hardware only, software only, or the combination thereof.

The control section 160 is a main processor configured to process and output signals such as image signals or sensor signals, instructions, or data. The input interface 122 receives operation signals or setup signals from input buttons or the like, and supplies the signals to the control section 160. The output interface 130 receives image signals from the control section 160 and controls the display device 190 to display the images. The backlight 132 supplies backlight to the liquid crystal display of the display device 190.

The communication control section 140 transmits, to external equipment, data input from the control section 160 by wired or wireless communication via the network adapter 142 or the antenna 144. The communication control section 140 receives data from external equipment by wired or wireless communication via the network adapter 142 or the antenna 144, and outputs the data to the control section 160.

The storage section 150 temporarily stores data, parameters, operation signals, and the like that are processed by the control section 160.

The GPS unit 161 receives position information from a GPS satellite and supplies the position information to the control section 160 in response to operation signals from the control section 160. The wireless unit 162 receives position information from a wireless base station and supplies the position information to the control section 160 in response to operation signals from the control section 160.

The posture sensor 164 detects posture information such as the orientation and tilt of the main body section 110 of the head-mounted display 100. The posture sensor 164 is achieved by combining a gyroscope, an accelerometer, an angular accelerometer, and the like as appropriate.

The external input/output terminal interface 170 is an interface for connecting peripheral equipment such as universal serial bus (USB) controllers. The external memory 172 is an external memory such as a flash memory.

The clock section 180 sets time information with setup signals from the control section 160 and supplies the time information to the control section 160.

FIG. 4 illustrates the external configuration of the input device 20. FIG. 4(a) illustrates the top surface configuration of the input device 20, and FIG. 4(b) illustrates the bottom surface configuration of the input device 20. The input device 20 includes a light-emitting body 22 and a handle 24. The light-emitting body 22 has a spherical exterior surface made of a light-transmitting resin and includes a light-emitting element such as a light-emitting diode or an electric bulb in the sphere. When the accommodated light-emitting element emits light, the entire exterior sphere shines. Operating buttons 30, 32, 34, 36, and 38 are provided on the top surface of the handle 24, and an operating button 40 is provided on the bottom surface thereof. The player operates the operating button 30, 32, 34, 36, or 38 with his/her thumb and operates the operating button 40 with the index finger while holding the end portion of the handle 24 with the hand. The operating buttons 30, 32, 34, 36, and 38 include pushbuttons and are operated as the player presses the operating buttons. The operating button 40 may receive analog quantities.

Figure 5:
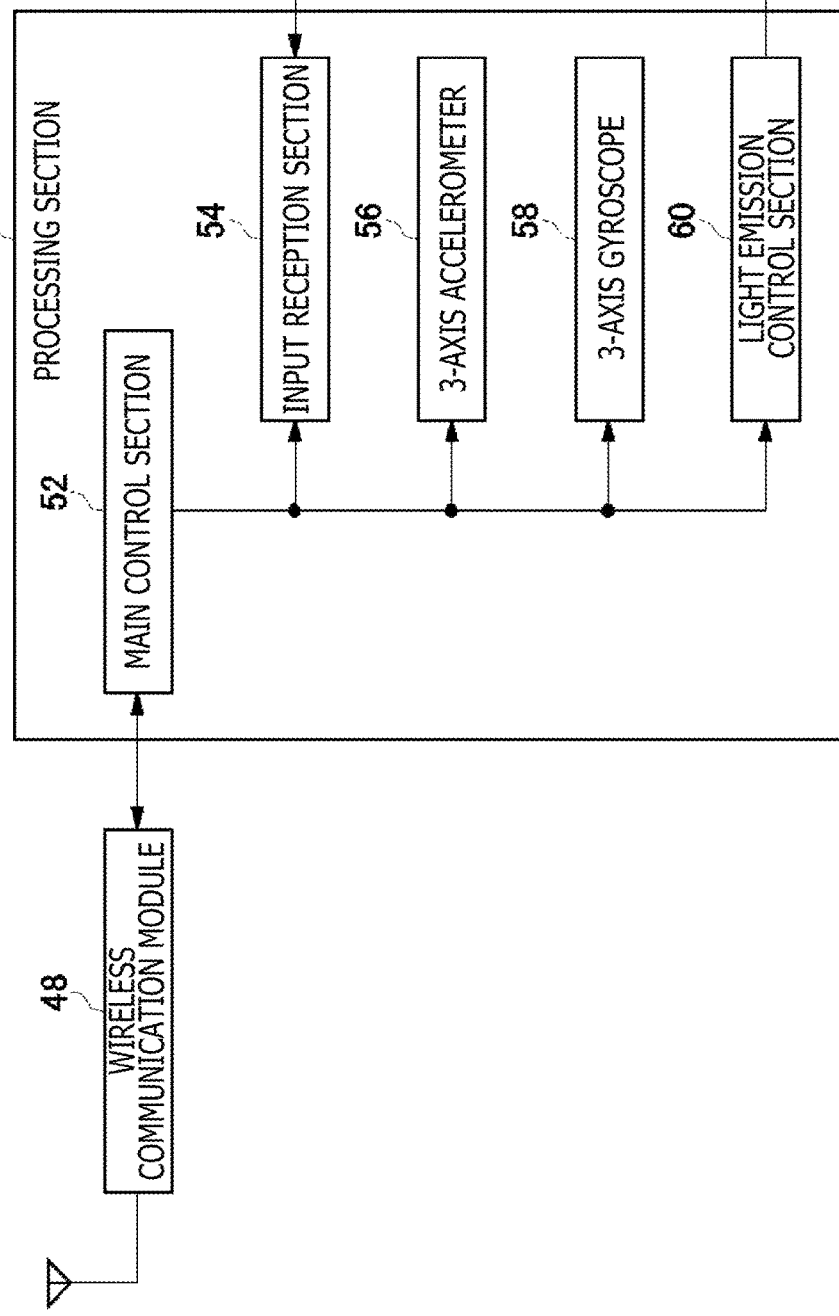
FIG. 5 is a diagram illustrating the internal configuration of the input device.

FIG. 5 illustrates the internal configuration of the input device 20. The input device 20 includes a wireless communication module 48, a processing section 50, a light-emitting section 62, and the operating buttons 30, 32, 34, 36, 38, and 40. The wireless communication module 48 has a function of transmitting/receiving data to/from the wireless communication module of the game device 10. The processing section 50 executes predetermined processing in the input device 20.

The processing section 50 includes a main control section 52, an input reception section 54, a 3-axis accelerometer 56, a 3-axis gyroscope 58, and a light emission control section 60. The main control section 52 transmits/receives necessary data to/from the wireless communication module 48.

The input reception section 54 receives input information from the operating button 30, 32, 34, 36, 38, or 40 and transmits the input information to the main control section 52. The 3-axis accelerometer 56 detects acceleration components in three axial directions of X, Y, and Z. The 3-axis gyroscope 58 detects angular velocities on XZ, ZY, and YX planes. Note that, here, the width, height, and length directions of the input device 20 are set as X, Y, and Z axes. The 3-axis accelerometer 56 and the 3-axis gyroscope 58 are disposed inside the handle 24 of the input device 20, and are preferably disposed near the center of the inner space of the handle 24. The wireless communication module 48 transmits, together with input information from the operating buttons, detection value information obtained by the 3-axis accelerometer 56 and detection value information obtained by the 3-axis gyroscope 58 to the wireless communication module of the game device 10 at a given interval. This transmission interval is set at 11.25 milliseconds, for example.

The light emission control section 60 controls the light emission of the light-emitting section 62. The light-emitting section 62 includes a red LED 64a, a green LED 64b, and a blue LED 64c, thereby being capable of emitting light in a plurality of colors. The light emission control section 60 controls the light emission of the red LED 64a, the green LED 64b, and the blue LED 64c to control the light-emitting section 62 to emit light in a desired color.

The wireless communication module 48 supplies, when receiving a light emission instruction from the game device 10, the light emission instruction to the main control section 52, and the main control section 52 supplies the light emission instruction to the light emission control section 60. The light emission control section 60 controls the light emission of the red LED 64a, the green LED 64b, and the blue LED 64c so that the light-emitting section 62 emits light in a color specified by the light emission instruction. For example, the light emission control section 60 may control the lighting of each LED through pulse width modulation (PWM) control.

Figure 6:
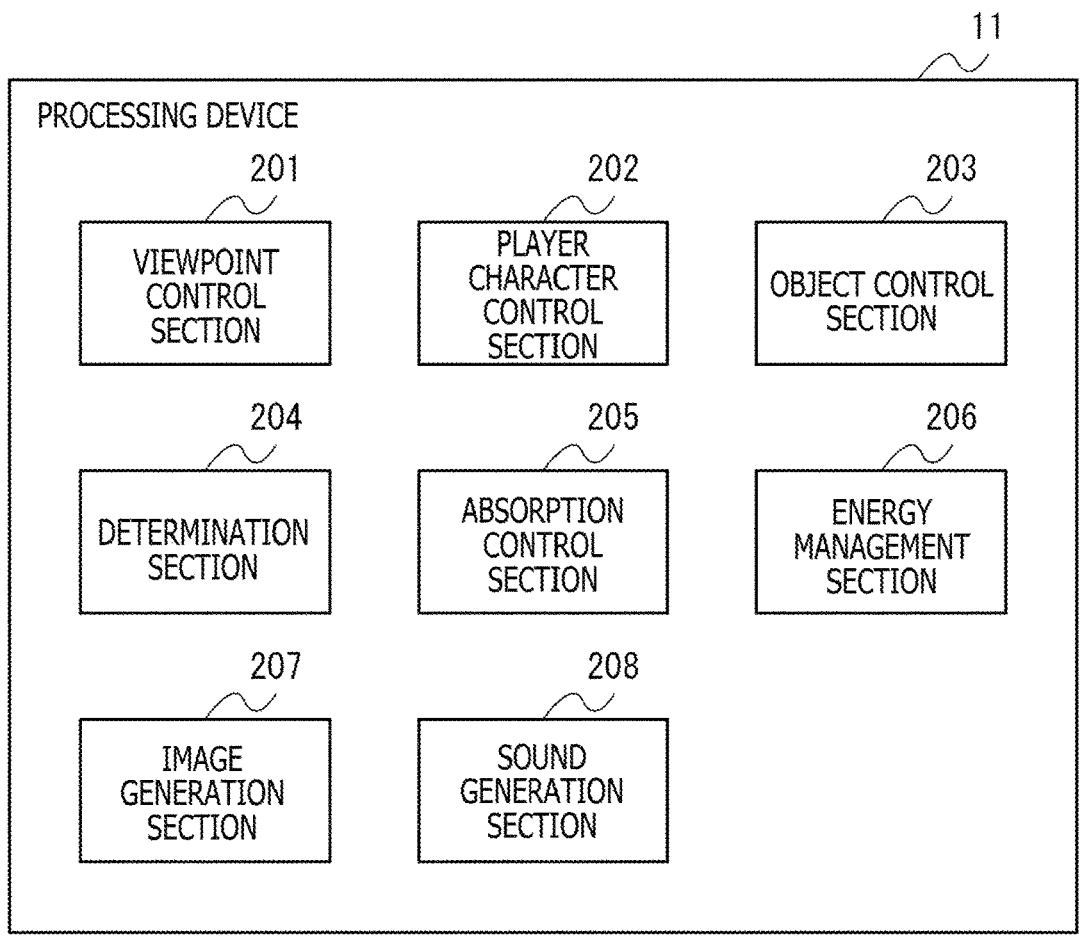
FIG. 6 is a functional configuration diagram of a game device.

FIG. 6 is a functional configuration diagram of the game device 10. The processing device 11 of the game device 10 includes a viewpoint control section 201, a player character control section 202, an object control section 203, a determination section 204, an absorption control section 205, an energy management section 206, an image generation section 207, and a sound generation section 208. These functional blocks can also be achieved in a variety of forms by hardware only, software only, or the combination thereof.

The viewpoint control section 201 controls the viewpoint position for generating the images of the game world. The viewpoint control section 201 sets the viewpoint near the player character's eyes, and moves the viewpoint position along with the movement of the player character. In the present embodiment, first-person view images are generated so that the movement of the player character and the movement of the viewpoint position are almost synonymous. In the present embodiment, to make the player feel relaxed and as if he/she is floating in the game world, the viewpoint position is automatically moved at a fixed speed along a route determined in advance in the game world. The viewpoint control section 201 may change, in a determined range (for example, a range of from a radius of several meters to tens of meters), the position or moving speed of the viewpoint depending on instructions from the player or situations in the game. For example, the viewpoint control section 201 may change the position or moving speed of the viewpoint in the determined range depending on instructions input to the input device 20, the movement or posture of the input device 20 or the head-mounted display 100, or the like. The movable range may be changed depending on locations or landscapes in the game world. For example, a wide movable range may be set for a vast grassland, while no movable range may be set for a location inside a cave or a narrow path so that the player can only move along a route determined in advance.

When the player character looks at a game object for a given period of time or longer, that is, when a target that is an object or character disposed in the game world is kept near the center of the display screen for the given period of time (for example, 2 to 3 seconds) (this is also called "focus"), the viewpoint control section 201 may move the viewpoint position toward the target. The viewpoint control section 201 may determine that the target is in focus when the target is kept near the center of the display screen for the given period of time and the player extends his/her hand or hands toward the target. Further, the viewpoint control section 201 may keep the viewpoint position at a position near the target when the player character is in a given range from the target or the player character is touching the target. With this, while the viewpoint position is automatically moved, in a case where the player is interested in a certain object or character and wants to touch or resonate with the object or the character, the target can be automatically determined and the player character can be kept at a position at which the player character can interact with the target. In another example, the viewpoint control section 201 may change the viewpoint position depending on instructions from the player. For example, the viewpoint control section 201 may change the viewpoint position depending on instructions input to the input device 20 or the movement or posture of the input device 20 or the head-mounted display 100.

The player character control section 202 controls the player character representing at least part of the player's body. In the present embodiment, to allow the player to operate the player character to touch the objects, the player character control section 202 moves the player character's hands and arms along with the movement of the input device 20. The player character control section 202 may move the player character's hands and arms along with, instead of the movement of the input device 20, the movement of a controller including a plurality of operating buttons or the movement of the player's hands and arms captured by the imaging device 14. In the latter case, the player character control section 202 may capture the player wearing a suit with markers or the like by the imaging device 14, and may analyze the movement of the markers to acquire the movement of the player. Alternatively, the player character control section 202 may capture the player by the imaging device 14 without using markers or the like and acquire the movement of the player by an optional known motion capture technology. In an example in which third-person view images are generated with the viewpoint position set behind or above the player character, for example, the player character's head may be moved along with the movement of the head-mounted display 100, or the player character's whole body may be moved along with the movement of the player's body captured by the imaging device 14.

The player character control section 202 determines the display form of the player character on the basis of the player's consciousness level, relaxation level, and the like. The player's consciousness level, relaxation level, and the like may be determined on the basis of, for example, the value of energy gained by the player in a game, the observed values of the player such as his/her heart rate, blood pressure, body temperature, and brain waves, and information obtained by analyzing the captured images of the player.

The object control section 203 controls the objects disposed in the game world. The objects include interactive objects with which the player character can interact, and noninteractive objects with which the player character cannot interact. The interactive objects include energy objects that can give energy to the player character when the player character touches the objects, and nonenergy objects that are interactive and are thus deformed when being touched by the player character, for example, but give no energy to the player character. The energy objects have any shape and may have, for example, animal, plant, or quartz crystal shapes, or spherical, cubic, rectangular, spheroidal, conical, or frustum shapes.

The object control section 203 controls movable objects such as animals to automatically move. The object control section 203 controls objects such as plants to flutter in the breeze. The object control section 203 controls objects in the water to float down the water stream. The object control section 203 controls the plurality of particles of the objects to sway. This can make the player feel relaxed.

The object control section 203 may control, when the player focuses on an object for a given period of time, the target object to move toward the player character. This allows the player to bring an object of interest close to him/her to touch or resonate with the object by gazing the object. The object control section 203 may change, when an object is in focus, the movement or display form of the particles of the object depending on how long the object is kept near the center of the display screen or where the object is kept. For example, as an object is kept near the center of the display screen for a longer period of time or kept at a position closer to the center of the display screen, the particles of the object may be condensed or displayed in dark colors so that the shape of the object is clear. In contrast, as an object is displayed farther from the center of the display screen, the particles of the object may be gradually diffused or displayed in light colors so that the object seems to disappear into the space. This can effectively make the player pay attention to the object. With this function, the player is repeatedly trained to take an interest in surrounding objects or characters and pay attention to the objects or the characters throughout a game so that the concentration and attention of the player can be enhanced.

The determination section 204 determines whether or not the player character has touched the objects. The determination section 204 may determine that the player character has touched an object when a distance between the outer surface of the player character's body and the outer surface of the object falls below a given value.

The absorption control section 205 executes, in a case where the determination section 204 determines that the player character has touched an object, an action representing that the plurality of particles included in the object that the player character has touched are absorbed by the player character. The absorption control section 205 may determine actions to be executed on the basis of the types of objects that the player character has touched. For example, the absorption control section 205 may execute, in a case where the player character has touched an energy body such as a crystal, an action in which the energy body is flicked off by the player character or deformed by being pressed by the player character, and then the particles inside the energy body pop out to move toward the player character. The absorption control section 205 may execute, in a case where the player character has touched an animal, a plant, or the like, an action in which the player character communicates or resonates with the animal, the plant, or the like, and then the player character and the animal, the plant, or the like exchange the particles present near their surfaces to absorb the particles from each other. Here, the absorption control section 205 may control the sound generation section 208 to generate and output binaural beats or the sound of crystal bowls, which are said to have an action of changing brain waves. This can put the player into a relaxed brain wave state and thus give more comfortable feeling to the player.

The energy management section 206 manages, as energy gained by the player, the number of particles that the player character has absorbed from the objects. The energy management section 206 adds energy also when the player character touches particles floating in the game world. The energy management section 206 adds energy when the player resonates with the objects such as animals or plants as described later. The energy management section 206 acquires, from the game server 3 or the like, information indicating how the real world has been going, and displays the information on the game screen. The energy management section 206 turns the information, which indicates the situation in the real world, around when the amount of energy gained by the player reaches a given value. This can enhance the mental state of the player and allows the player to feel as if the real world can be purified through the game.

The image generation section 207 renders the virtual three-dimensional space using a viewpoint position set by the viewpoint control section 201 and a line of sight set on the basis of the orientation of the head-mounted display 100, to thereby generate the image of the game world. The image generation section 207 changes, depending on the orientation of the head-mounted display 100, the line of sight for generating the image of the virtual three-dimensional space.

The sound generation section 208 generates sound in the game world. The sound generation section 208 sets sound sources to the objects or particles disposed in the game world, and generates, from the sound sources, sound unique to the types of the objects or the particles, to thereby generate sound in the game world.

Now, the operation of each configuration is described in detail with reference to a game screen.

Figure 7:
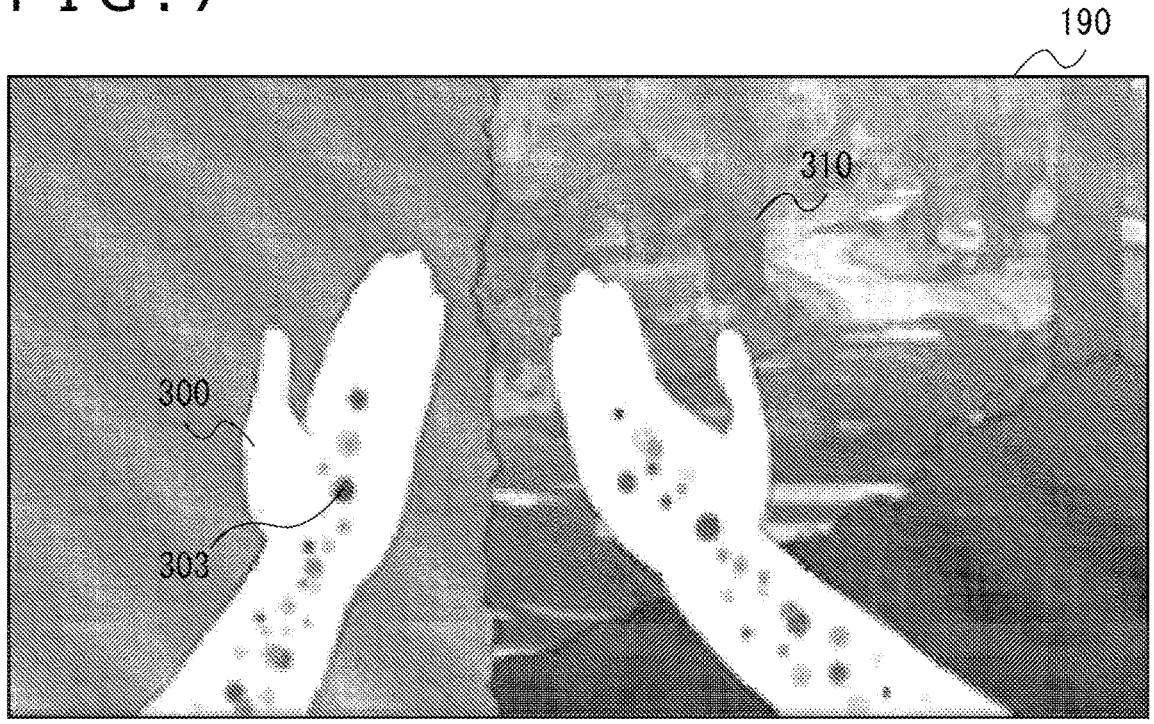
FIG. 7 is a diagram illustrating an exemplary game screen that is displayed on the display device of the head-mounted display.

FIG. 7 illustrates an exemplary game screen that is displayed on the display device 190 of the head-mounted display 100. On the game screen, an image obtained by rendering a game world, the hands of a player character 300, and a tree 310 that is an object disposed in the game world are displayed. Particles 303 are displayed inside the hands of the player character 300. The player character control section 202 moves the positions of the hands of the player character 300 along with the movement of the input device 20.

Figure 8:
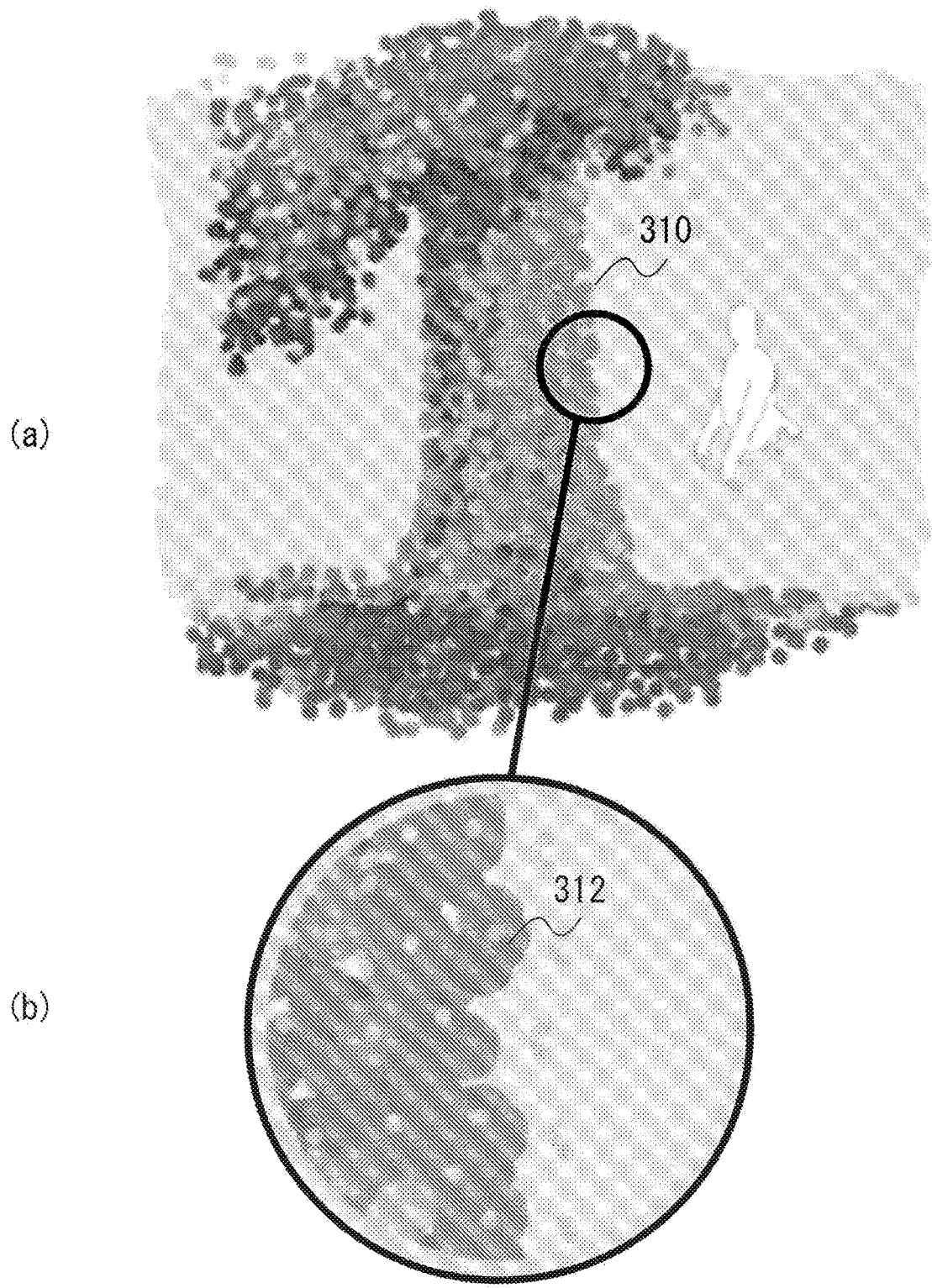
FIG. 8 depicts diagrams illustrating an exemplary object disposed in a game world.

FIG. 8 illustrates the exemplary object disposed in the game world. The tree 310 illustrated in FIG. 8(*a*) includes a large number of photons 312 as illustrated in FIG. 8(*b*), which is an enlarged diagram. The object control section 203 controls the particles 312 of the tree 310 to sway.

FIG. 9 illustrates the exemplary player character disposed in the game world. As illustrated in FIG. 9(a), the shape of the player character 300 is defined by a model 301 imitating the player's body. As illustrated in FIG. 9(b), the player character 300 is represented by a gaseous thin base body 302, which is a base, disposed in the model 301 and the large number of photons 303 that move inside and around the base body 302. Inside the base body 302, locators 304 for specifying the disposal positions or destinations of the particles 303 are provided. The player character control section 202 controls the base body 302 to slowly sway on the spot and controls the particles 303 to move inside the model 301.

The player character control section 202 gradually changes the display form of the player character 300 depending on the consciousness level of the player, and changes the display form in real time depending on the relaxation level of the player or actions such as breathing or purifying.

The player character control section 202 changes the size or color of the base body 302 depending on the relaxation level of the player. For example, as the relaxation level of the player is increased, the size of the base body 302 is increased and the color thereof is changed to a more whitish color. Further, the player character control section 202 changes the moving speed of the particles 303 depending on the relaxation level of the player. For example, as the relaxation level of the player is increased, the moving speed of the particles 303 is decreased. With this, the relaxation level of the player can be indicated in a visually understandable manner.

The player character control section 202 changes, depending on the consciousness level of the player, the length of the lower part of the base body 302, the number of the particles 303 that are generated from the lower body, the intensity or color of light surrounding the base body 302, the speed of the change of the intensity or color of the light, the types of colors, and the like. This allows the player to look at his/her consciousness level objectively, and to easily grasp, in a case where the player character corresponding to another player is displayed on the game screen, the consciousness level of the other player.

While the player is holding the input device 20 near his/her chest, the player character control section 202 displays the player character 300 putting its hand on its chest, increases the moving speed and light intensity of the particles 303, and changes the sound of the particles 303 flowing in the body of the player character 300, to thereby make the body of the player character 300 look like it is purified and filled with energy. Here, the energy management section 206 increases the energy of the player.

FIG. 10 and FIG. 11 illustrate exemplary video representation of the player character when the player breathes. The player character control section 202 analyzes the image of the player captured by the imaging device 14 to grasp the breathing action of the player from the up and down movement of the player's shoulders and the back and forth movement of the player's chest. When the player inhales, the player character control section 202 produces particles in front of the face of the player character 300, and controls the particles to move toward the mouth of the player character 300 as illustrated in FIG. 10(a). Further, the player character control section 202 makes the model 301 of the player character 300 expand as illustrated in FIG. 10(b). Here, as illustrated in FIG. 10(c), the particles 303 inside the model 301 are distributed so that the density is reduced. When the player exhales, the player character control section 202 controls particles 320 having remained in front of the face of the player character 300 to move away from the mouth as illustrated in FIG. 11(a). Further, the player character control section 202 makes the model 301 of the player character 300 shrink as illustrated in FIG. 11(b). Here, as illustrated in FIG. 11(c), the particles 303 inside the model 301 are condensed to increase the density so that the shape of the model 301 is clear. The breathing action visualized in this way can make the player focus on his/her breathing.

FIG. 12 is a diagram illustrating an interaction between the player character and an object or particles. The absorption control section 205 controls particles 330 inside a first range 331 around the player character 300 to move toward the player character 300. The first range 331 is set around the player character 300 and has a capsule shape. Whether the particles 330 collide with the first range 331 is determined and the particles 330 are moved toward the player character 300, but the same is not true for objects.

The determination section 204 determines whether or not the particles 330 or object disposed in the game world has come into contact with the boundary of a second range 332 around the player character 300. The second range 332 is smaller than the first range 331 and has a similar shape to the model of the player character 300. In a case where it is determined that the particles 330 or the object has entered the second range 332, the absorption control section 205 changes the display form of the particles 330 or the object to a display form indicating that the player character has touched the particles 330 or the object. For example, the absorption control section 205 makes the particles 330 or the object shine in a color corresponding to the type of the particles 330 or the object. Further, the absorption control section 205 sets a sound source to the particles 330 inside the second range 332, and emits sound based on the type of the particles 330 or the object from the sound source. In another example, a sound source may be set to the particles 330 inside a fourth range different from the second range 332.

The absorption control section 205 controls the particles 330 to move so that the particles 330 do not enter a third range 333 in front of the player character's eyes. For example, the absorption control section 205 controls the particles 330 that have come into contact with the boundary of the third range 333 to move along the boundary of the third range 333. This can prevent the display of a video in which the particles head toward the eyes of the player watching the game screen using the head-mounted display 100.

FIG. 13 illustrates an exemplary absorption action when the particles are absorbed by the player character. In a case where the particles 330 have come into contact with the face or body of the player character 300, as illustrated in FIG. 13(a), the absorption control section 205 makes the particles 330 enter the body of the player character 300 with a vector with which the particles 330 have moved inside the second range 332, and gradually fades the particles 330 to transparency to erase the particles 330 after a given period of time. In a case where the particles 330 have come into contact with the hand of the player character 300 as illustrated in FIG. 13(c), the absorption control section 205 makes the particles 330 circulate around the hand for a given period of time as illustrated in FIG. 13(d), and then controls the particles 330 to move toward the shoulder of the player character 300 as illustrated in FIG. 13(b). The absorption control section 205 gradually fades the particles 330 to transparency while controlling the particles 330 to move further toward the center of the chest, to thereby erase the particles 330 after a given period of time. The energy management section 206 adds the number of the particles 330 absorbed by the player character 300 as gained energy.

Figure 14:
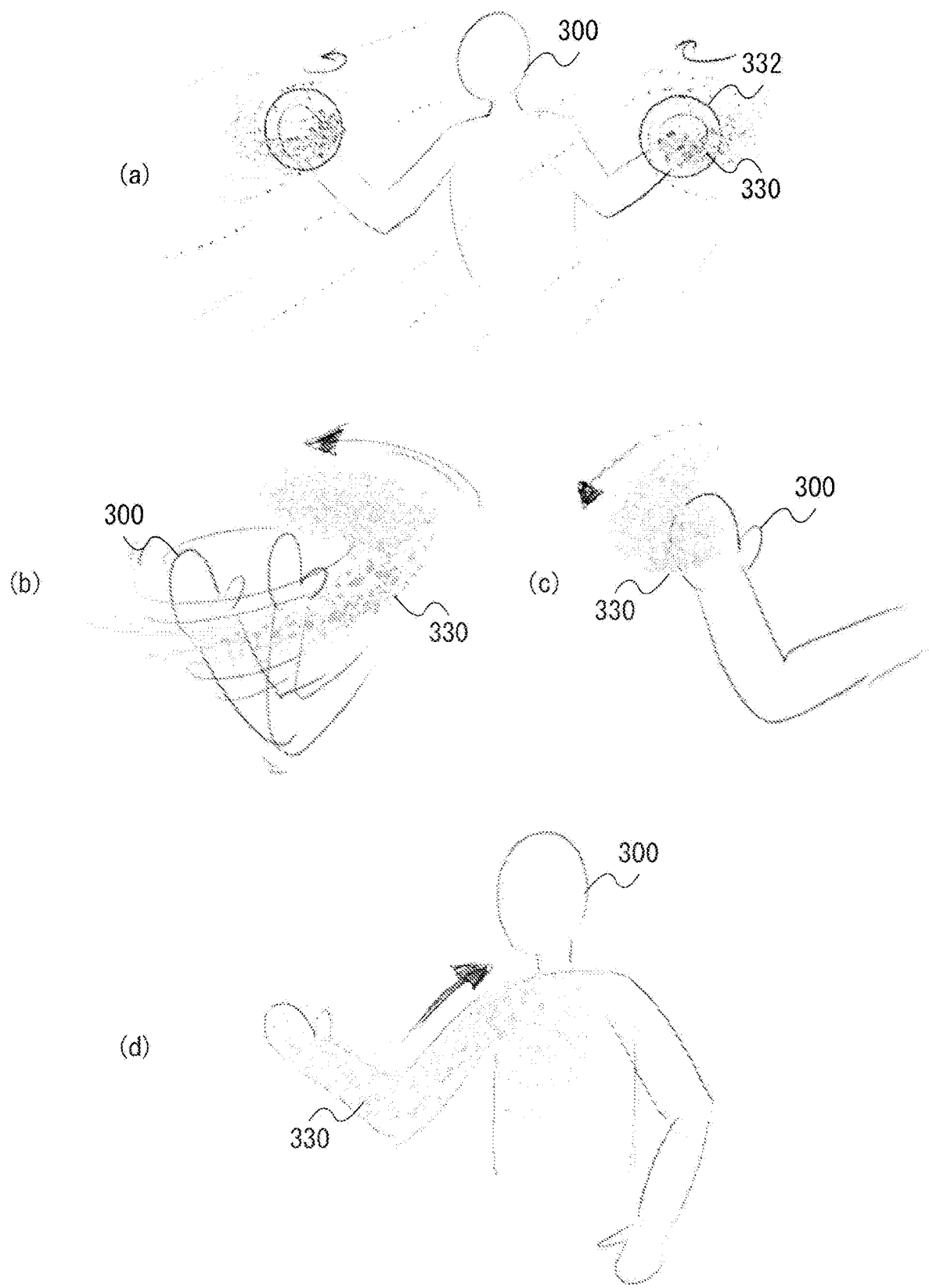
FIG. 14 depicts diagrams illustrating another exemplary absorption action when the particles are absorbed by the player character.

FIG. 14 illustrates another exemplary absorption action when the particles are absorbed by the player character. When the player slowly moves the input device 20 while the particles 330 are circulating around the hand of the player character 300 as illustrated in FIG. 13(d), the absorption control section 205 makes the particles 330 keep circulating around the hand of the player character 300 as illustrated in FIG. 14(a). When the player who has moved his/her hand as illustrated in FIG. 14(b) stops moving the hand, as illustrated in FIG. 14(c), the absorption control section 205 gradually decreases the circulation speed of the particles 330 circulating around the hand of the player character 300, and reduces the radius of circulation to bring the particles 330 closer to the hand. The absorption control section 205 then makes the particles 330 enter the chest through the arm and the shoulder as illustrated in FIG. 14(d).

In another example, the absorption control section 205 may control the particles 330 absorbed into the body of the player character 300 to stay inside the player character 300 together with the particles 303 included in the player character 300. With this, the amount of energy gained by the player can be indicated in a more visually understandable manner by the density of the particles inside the body of the player character 300. The absorbed particles 330 may be display in a different display form from the particles 303 of the body of the player character 300. In this example, when a large number of particles are accumulated inside the player character 300, the load of processing for controlling the individual particles to sway is large. The image generation section 207 accordingly displays a given number of (for example, 10) particles as a single combined particle regardless of the number of particles. Here, the image generation section 207 may display the combined particle in a different display form from the original particles. For example, the particle size, shape, display color, transparency, or the like may be different. To display a sufficient total number of particles, the image generation section 207 may control, in a case where the total number of particles to be displayed falls below a given number (for example, 100) when combined particles each including the given number of particles are displayed, the number of particles to be displayed as combined particles, to thereby display a total number of particles that is equal to or larger than the given number. In a similar manner, the sound generation section 208 combines sound sources as a single sound source by a given number of particles to generate sound. With this, the processing load can be reduced while the video and sound effects are maintained.

Also in a case where the player character 300 has touched an object, the player character 300 can absorb energy from the object as in the case where the player character 300 has touched floating particles. While the object is being held in contact with the boundary of the second range 332 around the player character 300, the absorption control section 205 controls the sound generation section 208 to generate sound effect and breath sound unique to the object, and controls the particles to flow into the body of the player character 300 through the hand touching the object. The energy management section 206 reduces, while the player character 300 is absorbing energy from the object, the amount of energy of the object. When the player character 300 lets go of the object, the absorption control section 205 interrupts the energy absorption. The absorption control section 205 ends the energy absorption when the amount of energy of the object reaches zero. From the object having no energy, the player character 300 cannot absorb energy even when it touches the object again.

In the present embodiment, the amount of energy of an object is set in advance as a unique parameter, and the player basically cannot absorb energy equal to or larger than this value from the object. The player can, however, absorb energy equal to or larger than the unique energy amount of the object when the player character resonates or harmonizes with the object.

As described above, while the player character 300 is touching an object, the absorption control section 205 controls the sound generation section 208 to generate the breath sound of the object. When the player breathes in synchronization with the breath sound, the energy management section 206 increases the amount of energy that the object can emit. This allows the player to focus on his/her breathing action more, and can prompt the enhancement of the mental and health states through proper breathing.

FIG. 15 illustrates an exemplary absorption action when the particles of an object are absorbed by the player character. As illustrated in FIG. 15(a), also an animal disposed in the game world such as an elephant 314 includes a plurality of particles. When the player character 300 touches the elephant 314 with his/her hand as illustrated in FIG. 15(b), the absorption control section 205 executes an action representing that particles 315 of the elephant 314 are absorbed into the body of the player character 300 through the hand as illustrated in FIG. 15(c). The particles 315 of the surface of the elephant 314 may have a different appearance from the particles 303 of the hand of the player character 300. For example, as illustrated in FIG. 15(c), the particles 315 of the elephant 314 are different from the particles 303 of the player character 300 in particle size, shape, display color, transparency, or the like. This allows the player to clearly recognize that particles 316 inside the player character 300 have been absorbed from the elephant 314, and to feel as if he/she assimilates with the elephant 314. The absorption control section 205 controls the particles 316 absorbed into the body of the player character 300 to move from the hand of the player character 300 toward its chest through its arm. This allows the player to feel as if the energy absorbed from the elephant 314 is soaked into the body of the player. While controlling the particles 315 absorbed into the body of the player character 300 to move, the absorption control section 205 may change the appearance of the particles 315 to the same appearance as the particles 303 of the player character 300. This allows the player to feel as if the energy absorbed from the elephant 314 is converted to the energy of the player him/herself. The particles 315 of the elephant 314 and the particles 303 of the player character 300 may have the same or similar appearances. This can represent a worldview in which all matter in the game world includes the same or similar particles and can exchange energy with each other. Further, the player can feel as if the energy absorbed from the elephant 314 is accumulated in the body of the player.

Figure 16:
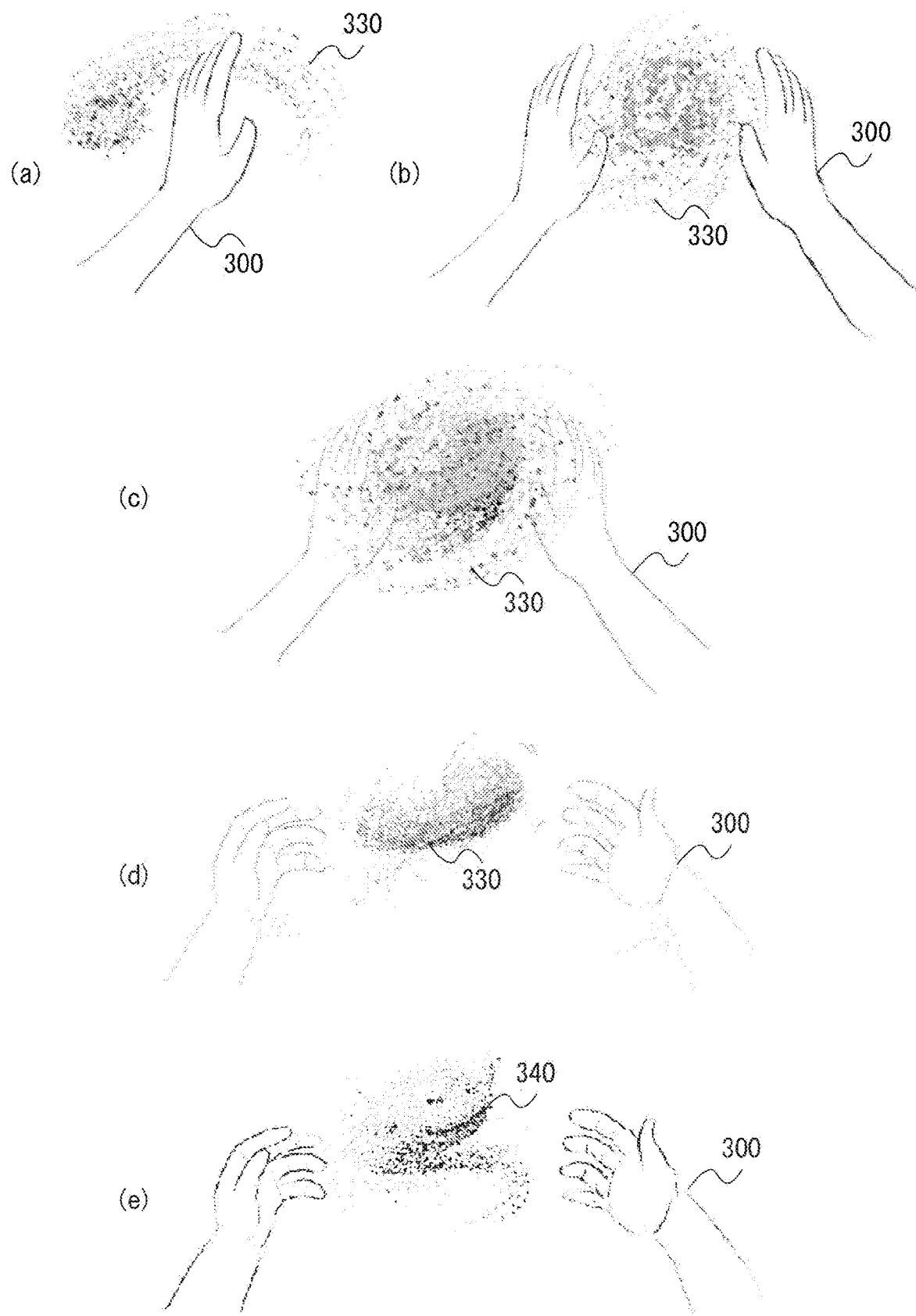
FIG. 16 depicts diagrams illustrating another exemplary interaction between the player character and the particles.

FIG. 16 illustrates another exemplary interaction between the player character and the particles. When the player who have gained energy equal to or more than a given value puts the input devices 20a and 20b closer to each other to put the hands of the player character 300 closer to each other as illustrated in FIG. 16(a) and FIG. 16(b), the energy management section 206 displays the energy particles 330 between the hands and gradually increases the number of the particles 330. After a few seconds have elapsed under this state, as illustrated in FIG. 16(c), the energy management section 206 changes the display form of the particles 330 to present the player that a new object is ready to be generated. As the player increases the gap between his/her hands while moving the hands, as illustrated in FIG. 16(d), the energy management section 206 changes the shape of the particle group displayed between the hands of the player character 300. Eventually, as illustrated in FIG. 16(e), the energy management section 206 forms an object 340 and controls the object 340 to move around the player character 300. This can motivate the player to accumulate more energy.

Figure 17:
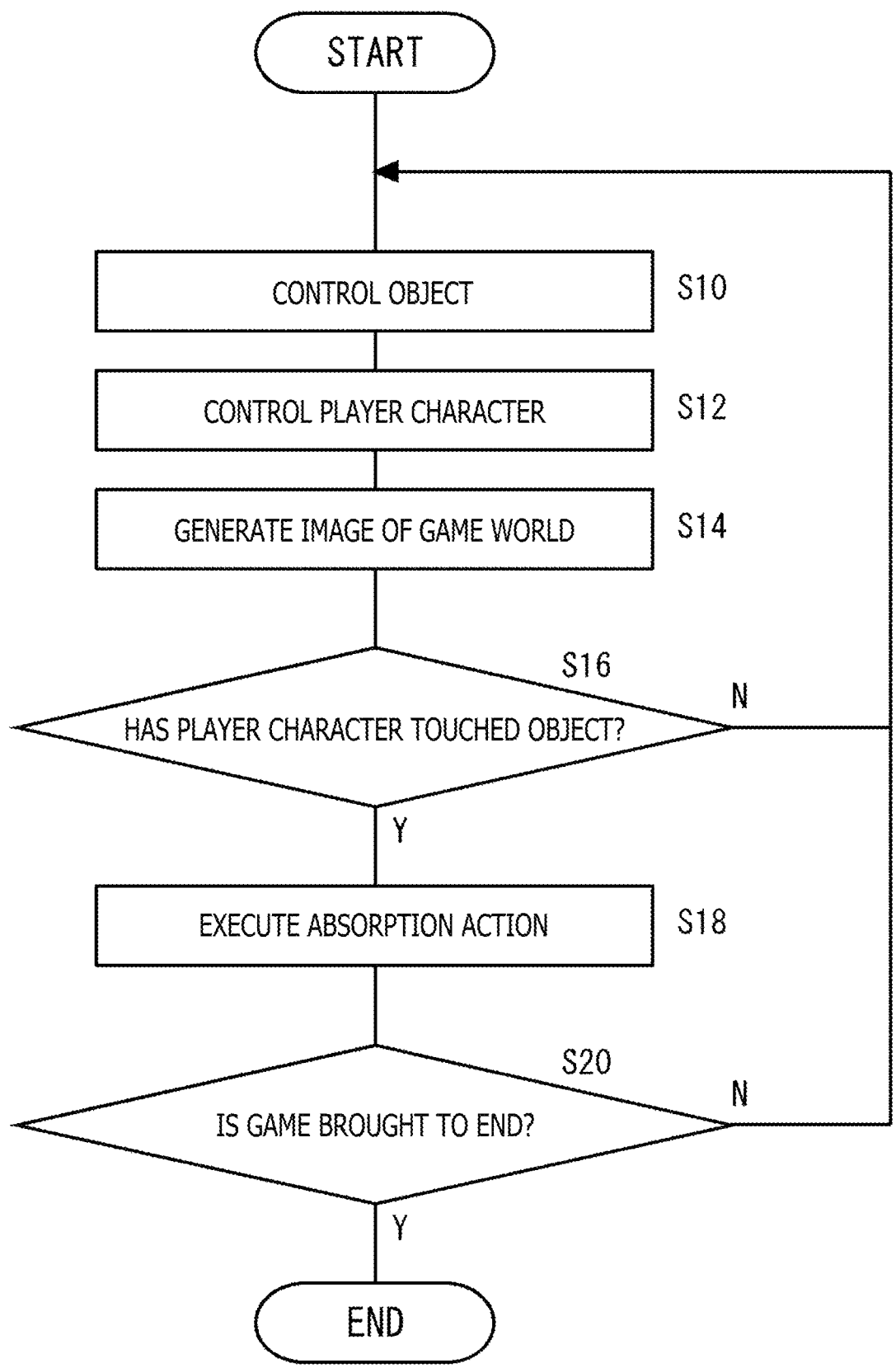
FIG. 17 is a flowchart illustrating the procedure of a game control method according to the embodiment.

FIG. 17 is a flowchart illustrating the procedure of a game control method according to the embodiment. The object control section 203 controls an object disposed in a virtual three-dimensional space, the object including a plurality of particles (S10). The player character control section 202 controls a player character disposed in the virtual three-dimensional space, the player character being operable by the player (S12). The image generation section 207 generates the image of the virtual three-dimensional space (S14). The determination section 204 determines whether or not the player character has touched the object (S16). When a negative determination is made (N in S16), the processing returns to S10. When a positive determination is made (Y in S16), the absorption control section 205 executes an action representing that the plurality of particles included in the object that the player character has touched are absorbed by the player character (S18). In a case where the game is not brought to an end (N in S20), the processing returns to S10. In a case where the game is brought to an end (Y in S20), the processing ends.

The present invention is described above on the basis of the embodiment. The embodiment is exemplary and it should be understood by persons skilled in the art that the combinations of the components and the processing processes can be modified, and that such modified examples are also within the scope of the present invention.

INDUSTRIAL APPLICABILITY

The present invention is applicable to display control devices configured to control display on display devices.

REFERENCE SIGNS LIST

1: Game system
3: Game server
10: Game device
11: Processing device
12: Output control device
13: Storage device
14: Imaging device
15: Output device
20: Input device
100: Head-mounted display
201: Viewpoint control section
202: Player character control section
203: Object control section
204: Determination section
205: Absorption control section
206: Energy management section
207: Image generation section
208: Sound generation section.

The invention claimed is:

1. A non-transitory, computer readable storage medium containing a program, which when executed by a computer, causes the computer to perform a display control method by carrying out actions, comprising:

generating an image of a virtual three-dimensional space;
controlling an object disposed in the virtual three-dimensional space, the object including a plurality of particles;
controlling a player character disposed in the virtual three-dimensional space, the player character being operable by a player;
determining whether or not the player character has touched the object; and
executing, in a case where it is determined that the player character has touched the object, an action representing that the plurality of particles included in the object that the player character has touched are absorbed by the player character.

2. The non-transitory, computer readable storage medium according to claim 1, wherein
the player character includes an object representing at least part of a body of the player,
the image generation section sets a viewpoint position for generating the image of the virtual three-dimensional space near a position of an eye of the player character, and
the player character control section controls movement of a hand of the player character along with the movement of the hand of the player.

3. The non-transitory, computer readable storage medium according to claim 2, wherein
the image generation section generates an image to be displayed on a head-mounted display that is worn on a head of the player, and
the image generation section changes, depending on an orientation of the head-mounted display, a line of sight for generating the image of the virtual three-dimensional space.

4. The non-transitory, computer readable storage medium according to claim 1, wherein the absorption control section controls particles inside a first range around the player character to move toward the player character.

5. The non-transitory, computer readable storage medium according to claim 4, wherein the absorption control section changes, when particles enter a second range smaller than the first range around the player character, a display form of the particles to a display form indicating that the player character has touched the particles.

6. The non-transitory, computer readable storage medium according to claim 4, wherein the absorption control section controls the particles to move such that the particles do not enter a third range in front of an eye of the player character.

7. The non-transitory, computer readable storage medium according to claim 1, wherein the absorption control section changes, when the particles reach a surface of the player character, the display form of the particles to a display form indicating that the particles are absorbed by the player character.

8. The non-transitory, computer readable storage medium according to claim 7, wherein
the player character includes a plurality of particles, and
the plurality of particles included in the player character are displayed in a different display form from the plurality of particles included in the object.

9. The non-transitory, computer readable storage medium according to claim 8, wherein the plurality of particles included in the player character have a different particle size from the plurality of particles included in the object.

10. The non-transitory, computer readable storage medium according to claim 8, wherein the plurality of particles included in the player character are displayed in a different display color from the plurality of particles included in the object.

11. The non-transitory, computer readable storage medium according to claim 8, wherein the absorption control section controls the particles absorbed by the player character to stay inside the player character together with the particles included in the player character.

12. The non-transitory, computer readable storage medium according to claim 11, wherein the absorption control section controls the particles absorbed by the player character to move.

13. The non-transitory, computer readable storage medium according to claim 7, wherein the absorption control section erases the particles absorbed by the player character.

14. The non-transitory, computer readable storage medium according to claim 1, wherein the image generation section displays a given number of the particles as a single combined particle.

15. The non-transitory, computer readable storage medium according to claim 1, further causing a computer to achieve:
   a sound generation section configured to generate sound in the virtual three-dimensional space,
   wherein the sound generation section sets a sound source to particles inside a fourth range around the player character, to thereby generate sound emitted from the sound source.

16. The non-transitory, computer readable storage medium according to claim 15, wherein the sound generation section combines sound sources as a single sound source by a given number of the particles to generate the sound.

17. The non-transitory, computer readable storage medium according to claim 1, wherein the image generation section acquires information regarding a player character operated by another player from a server, and generates an image in which the player character operated by the another player is disposed in the virtual three-dimensional space.

18. A display control device comprising:
   an image generation section configured to generate an image of a virtual three-dimensional space;
   an object control section configured to control an object disposed in the virtual three-dimensional space, the object including a plurality of particles;
   a player character control section configured to control a player character disposed in the virtual three-dimensional space, the player character being operatable by a player;
   a determination section configured to determine whether or not the player character has touched the object; and
   an absorption control section configured to execute, in a case where the determination section determines that the player character has touched the object, an action representing that the plurality of particles included in the object that the player character has touched are absorbed by the player character.

19. A display control method, comprising:
generating an image of a virtual three-dimensional space;
controlling an object disposed in the virtual three-dimensional space, the object including a plurality of particles;
controlling a player character disposed in the virtual three-dimensional space, the player character being operatable by a player;
determining whether or not the player character has touched the object; and
executing, in a case where it is determined that the player character has touched the object, an action representing that the plurality of particles included in the object that the player character has touched are absorbed by the player character.

\* \* \* \* \*